(12) United States Patent
Ye

(10) Patent No.: US 12,430,010 B2
(45) Date of Patent: Sep. 30, 2025

(54) SCREEN RECORDING METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Qiuqiang Ye, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 77 days.

(21) Appl. No.: 18/451,610

(22) Filed: Aug. 17, 2023

(65) Prior Publication Data

US 2023/0393718 A1 Dec. 7, 2023

Related U.S. Application Data

(63) Continuation of application No. PCT/CN2021/143847, filed on Dec. 31, 2021.

(30) Foreign Application Priority Data

Feb. 22, 2021 (CN) .......................... 202110199716.9

(51) Int. Cl.
*G06F 3/0484* (2022.01)
*G06F 9/451* (2018.01)

(52) U.S. Cl.
CPC ............ *G06F 3/0484* (2013.01); *G06F 9/451* (2018.02)

(58) Field of Classification Search
CPC ................... G06F 3/0484; G06F 9/451; G06F 2203/04803; G06F 3/0481; G06F 3/04842; G06F 3/04883; G06F 3/04886; G06F 3/0488; H04N 21/4334; H04N 21/4312; H04N 21/4438
See application file for complete search history.

(56) References Cited

U.S. PATENT DOCUMENTS

2008/0172617 A1 7/2008 Takeda et al.
2014/0068503 A1 3/2014 Yoon
(Continued)

FOREIGN PATENT DOCUMENTS

CN 106598380 4/2017
CN 107529086 12/2017
(Continued)

OTHER PUBLICATIONS

WIPO, International Search Report and Written Opinion for PCT/CN2021/143847, Mar. 29, 2022.
(Continued)

*Primary Examiner* — Andrey Belousov
(74) *Attorney, Agent, or Firm* — Hodgson Russ LLP

(57) ABSTRACT

Provided are a screen recording method, an electronic device, and a storage medium. In the method, an interface is displayed, where the interface includes a screen recording control and at least one display container, and the screen recording control is configured to control recording of screen contents. A target display container is determined according to a positional relationship between the screen recording control and the at least one display container. A screen recording area is determined based on a display area of the target display container.

20 Claims, 11 Drawing Sheets

(56) References Cited

U.S. PATENT DOCUMENTS

2017/0286547 A1* 10/2017 Torres Acosta ....... G06F 3/0482
2022/0214802 A1*  7/2022 Xiong ................. G06F 3/04886
2023/0022300 A1*  1/2023 Jung .................. G06F 3/04842

FOREIGN PATENT DOCUMENTS

| CN | 107547799 | 1/2018 |
| CN | 107957836 | 4/2018 |
| CN | 108920226 | 11/2018 |
| CN | 110119240 | 8/2019 |
| CN | 110417991 | 11/2019 |
| CN | 111858277 | 10/2020 |
| CN | 111866423 | 10/2020 |
| CN | 112153436 | 12/2020 |
| KR | 20150056346 | 5/2015 |

OTHER PUBLICATIONS

CNIPA, First Office Action for CN Application No. 202110199716. 9, Sep. 20, 2022.
CNIPA, Second Office Action for CN Application No. 202110199716. 9, Mar. 10, 2023.
CNIPA, Decision of Rejection for CN Application No. 202110199716. 9, May 16, 2023.
EPO, Extended European Search Report for EP Application No. 21926396.9, Jun. 27, 2024.
CNIPA, Notification of Reexamination for CN Application No. 202110199716.9, Nov. 1, 2024.
CNIPA, Decision of Reexamination for CN Application No. 202110199716.9, Dec. 10, 2024.

* cited by examiner

SCREEN RECORDING METHOD, ELECTRONIC DEVICE, AND STORAGE MEDIUM

CROSS-REFERENCING OF RELEVANT APPLICATIONS

This application is a continuation of International Patent Application No. PCT/CN2021/143847, filed Dec. 31, 2021, which claims priority to Chinese Patent Application No. 202110199716.9, filed Feb. 22, 2021, the entire disclosures of which are incorporated herein by reference.

TECHNICAL FIELD

The present disclosure relates to the technical field of electronic devices, and particularly to a screen recording method, an electronic device and a storage medium.

BACKGROUND

With the development of science and technology, electronic devices are more and more widely used, and they have more and more functions. Electronic devices have become one of the necessities in people's daily life. At present, the electronic devices generally supports a screen recording function.

SUMMARY

In view of the above, the present disclosure provides a screen recording method, an electronic device and a storage medium.

In a first aspect, an embodiment of the present disclosure provides a screen recording method. In the method, an interface is displayed, where the interface includes a screen recording control and at least one display container, and the screen recording control is configured to control recording of screen contents. A target display container is determined according to a positional relationship between the screen recording control and the at least one display container. A screen recording area is determined based on a display area of the target display container.

In a second aspect, an embodiment of the present disclosure provides an electronic device including a memory and a processor. The memory is coupled to the processor and the memory stores instructions. The instructions, when being executed by the processor, cause the processor to: determine a target display container according to a positional relationship between a screen recording control and at least one display container that are displayed on an interface, where the screen recording control is configured to control recording of screen contents. The instructions, when being executed, cause the processor further to determine a screen recording area based on a display area of the target display container.

In a third aspect, an embodiment of the present disclosure provides a non-transitory computer-readable storage medium storing program codes therein. The program codes may be invoked by a processor to: acquire a position of the screen recording control and a position of at least one display container, where the screen recording control and the at least one display container are displayed on an interface, and the screen recording control is configured to control recording of screen contents. The program codes may be invoked by a processor to determine a target display container according to a positional relationship between the screen recording control and the at least one display container, where the position relationship is determined based on the position of the screen recording control and the position of at least one display container. The program codes may be invoked by a processor further to determine a screen recording area based on a display area of the target display container.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to provide clearer explanation of technical solutions in the embodiments of the present disclosure, drawings required in the description of the embodiments are introduced briefly below. It is evident that the drawings in the following description are only some embodiments of the present disclosure. For those skilled in the art, other drawings may be obtained based on these drawings without any creative effort.

DETAILED DESCRIPTION OF EMBODIMENTS

Figure 1:
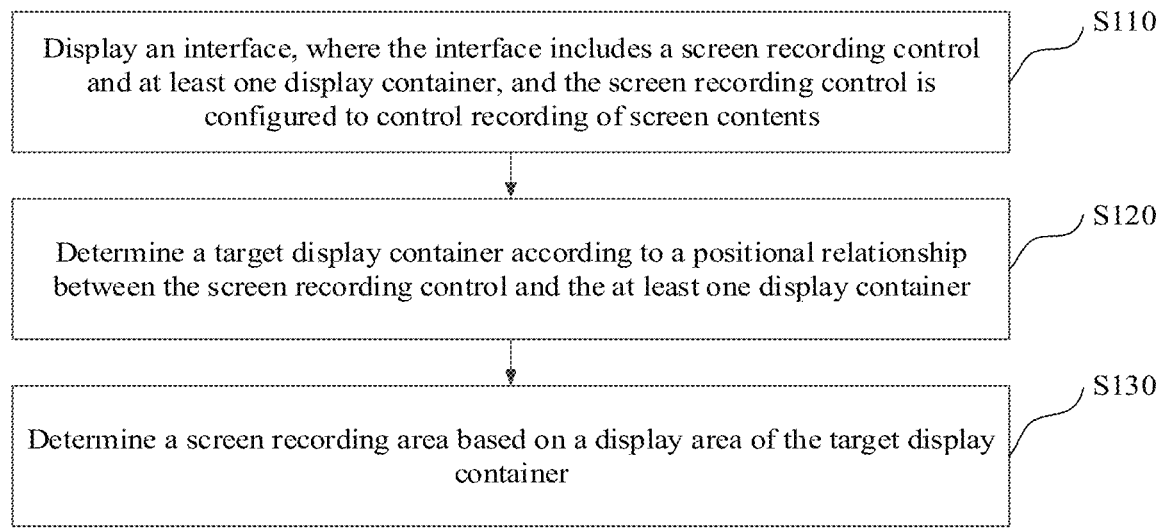
FIG. 1 illustrates a schematic flowchart of a screen recording method provided in an embodiment of the present disclosure.

In order to make those skilled in the technical field better understand the solutions of the present disclosure, the technical solutions in the embodiments of the present disclosure will be described clearly and comprehensively with reference to the drawings.

With the development of science and technology, electronic devices are widely used, and they have more and more functions. Electronic devices have become one of the necessities in people's daily lives. At present, when one desires to record an image or video in our lives, he/she may capture the image or video through a camera function of the electronic device. And when one desires to record the screen contents, he/she may perform screen recording through a screen recording function of the electronic device. The screen recording function enables dynamic contents occurring on the screen, such as a flow being operated and a video being played, to be recorded. However, after research, the inventor found that there is simplicity in the existing screen recording function of the electronic device, which cause the user's screen recording experience to be not good.

In view of the above problems, the inventor discovered and proposed, after long-term research, a screen recording method and apparatus, an electronic device and a storage medium as provided in the embodiments of the present disclosure. In particular, a target display container is determined according to a positional relationship between a screen recording control and at least one display container, and a screen recording area is determined based on a display area of the target display container. As such, the diversity of the screen recording area is increased, and the screen recording experience of the user is improved. The specific screen recording method is described in detail in the following embodiments.

The embodiments of the present disclosure provide a screen recording method. In the method, an interface is displayed, where the interface includes a screen recording control and at least one display container, and the screen recording control is configured to control recording of screen contents. A target display container is determined according to a positional relationship between the screen recording control and the at least one display container. A screen recording area is determined based on a display area of the target display container.

According to the embodiments of the present disclosure, determining the target display container according to the positional relationship between the screen recording control and the at least one display container includes: determining, as the target display container, one of the at least one display container with which the screen recording control fully or partially overlaps.

According to the embodiments of the present disclosure, after determining, as the target display container, one of the at least one display container with which the screen recording control fully or partially overlaps, the method further includes: displaying the screen recording control at a target position in the display area of the target display container.

According to the embodiments of the present disclosure, displaying the screen recording control at the target position in the display area of the target display container includes: simplifying display parameters of the screen recording control, to obtain a target screen recording control; and displaying the target screen recording control at the target position in the display area of the target display container.

According to the embodiments of the present disclosure, the method further includes: in response to the screen recording control not overlapping with the at least one display container, determining a display area of the interface as the screen recording area.

According to the embodiments of the present disclosure, after determining the display area of the interface as the screen recording area, the method further includes: recording screen contents in the interface with the screen recording control and the at least one display container concealed.

According to the embodiments of the present disclosure, before determining the target display container according to the positional relationship between the screen recording control and the at least one display container, the method further includes: acquiring a position of the screen recording control on the interface.

According to the embodiments of the present disclosure, acquiring the position of the screen recording control on the interface includes: in response to a click event performed on the screen recording control, acquiring the position of the screen recording control at a time when the click event is triggered.

According to the embodiments of the present disclosure, acquiring the position of the screen recording control on the interface includes: in response to a dragging event performed on the screen recording control, acquiring the position of the screen recording control at a time when the dragging event ends.

According to the embodiments of the present disclosure, after determining the screen recording area based on the display area of the target display container, the method further includes: recording the screen contents in the screen recording area.

According to the embodiments of the present disclosure, recording the screen contents in the screen recording area includes: displaying a selection control; and in response to detecting a confirmation operation performed on the selection control, recording the screen contents in the screen recording area.

According to the embodiments of the present disclosure, recording the screen contents in the screen recording area includes: in response to detecting a target touch operation performed on the screen recording control, recording the screen contents in the screen recording area.

According to the embodiments of the present disclosure, determining the target display container according to the positional relationship between the screen recording control and the at least one display container includes: in response to the screen recording control being moved, based on the dragging event, to a position where the screen recording control has an overlapping area with a to-be-determined display container of the at least one display container, acquiring a size of the overlapping area; and in response to the size of the overlapping area is larger than a preset size, determining the to-be-determined display container as the target display container.

According to the embodiments of the present disclosure, acquiring the size of the overlapping area includes: acquiring coordinate information of the to-be-determined display container, and acquiring coordinate information of the screen recording control; acquiring the size of the overlapping area, based on the coordinate information of the to-be-determined display container and the coordinate information of the screen recording control.

According to the embodiments of the present disclosure, determining the target display container according to the positional relationship between the screen recording control and the at least one display container includes: in response to the screen recording control being moved, based on the dragging event, to a position where the screen recording control has an overlapping area with a to-be-determined display container of the at least one display container, acquiring a duration during which the overlapping area exists between the screen recording control and the to-be-determined display container; and in response to the duration being longer than a preset duration, determining the to-be-determined display container as the target display container.

According to the embodiments of the present disclosure, before determining the target display container according to the positional relationship between the screen recording control and the at least one display container, the method further includes: acquiring, as first coordinate information, coordinate information of the at least one display container in a coordinate system, where the coordinate system is established in the interface; acquiring, as second coordinate information, coordinate information of the screen recording control in the coordinate system; and obtaining, based on the first coordinate information and the second coordinate information, the positional relationship between the screen recording control and the at least one display container.

According to the embodiments of the present disclosure, before determining the target display container according to the positional relationship between the screen recording control and the at least one display container, the method further includes: acquiring, as a first display position, a display position of the at least one display container; acquiring, as a second display position, a display position of the screen recording control; and obtaining, based on the first display position and the second display position, the positional relationship between the screen recording control and the at least one display container.

Referring to FIG. 1, a schematic flowchart of a screen recording method provided in an embodiment of the present disclosure is illustrated. In the screen recording method, a target display container is determined according to a positional relationship between a screen recording control and at least one display container, and a screen recording area is determined based on a display area of the target display container, which increases the diversity of the screen recording area and improves the screen recording experience of the user. In a specific implementation, the screen recording method is applied to a screen recording apparatus 200 illustrated in FIG. 17, and an electronic device 100 (illustrated in FIG. 18) equipped with the screen recording apparatus 200. Hereinafter, a specific flow of the embodiment is described by taking the electronic device as an example. Of course, it is understandable that the electronic device to which the embodiments are applied may include smart phone, tablet computer, wearable electronic device, etc., which are not limited here. The flow illustrated in FIG. 1 is described in detail below, and the screen recording method may specifically include the following blocks.

At block S110, an interface is displayed, where the interface includes a screen recording control and at least one display container, and the screen recording control is configured to control recording of screen contents.

In the embodiment, the interface includes the screen recording control and the at least one display container. The at least one display container may display information of an application(s). For example, it may display picture information corresponding to a photo album application, preview image information corresponding to a camera application, audio-video information corresponding to a video application, text information corresponding to a reading application, and commodity image information corresponding to a shopping application, and so on, which are not limited here. The screen recording control may be configured to control the recording of contents on the screen. For example, the electronic device may trigger the screen recording upon detecting a target touch operation performed on the screen recording control. In some implementations, the target touch operation performed on the screen recording control may include, but is not limited to: a single-finger click operation performed on the screen recording control; a multi-finger click operation performed on the screen recording control; a pressing operation performed on the screen recording control with a corresponding pressing force greater than a preset pressing force; a pressing operation performed on the screen recording control with a corresponding pressing duration longer than a preset duration; and a drag operation performed on the screen recording control.

In some implementations, the display container may be a split-screen window or a floating window, or may include both the split-screen window and the floating window, which is not limited here. Taking a case where the display container is the split-screen window as an example, the interface may include the screen recording control and multiple split-screen windows. For example, the interface may include the screen recording control and two split-screen windows, or include the screen recording control and four split-screen windows, etc., which are not limited here. Taking a case where the display container is the floating window as an example, the interface may include the screen recording control and at least one floating window. For example, the interface may include the screen recording control and one floating window, or include the screen recording control and two floating windows, etc., which are not limited here. Taking a case where the display container includes both the split-screen window and the floating window as an example, the interface may include the screen recording control, multiple split-screen windows, and at least one floating window, For example, the interface may include the screen recording control, two split-screen windows and one floating window, which is not limited here.

As an implementation, when the interface is displayed, the screen recording control and the at least one display container included in the interface may occupy part of the interface. As another implementation, in the process of displaying the interface, the display positions and display dimensions of the screen recording control and the at least one display container in the interface may be changed. As a further implementation, in the process of displaying the interface, there may be or may not be an overlapping area between the screen recording control and the at least one display container. In the case where the display container is the floating window, when the screen recording control and the at least one display container are initially displayed, there may be no overlapping area between the screen recording control and the at least one display container by default.

In some implementations, when the user wants to trigger a display interface of the electronic device, he/she may send instruction information to the electronic device; and when receiving the instruction information sent by the user, the electronic device may display the interface in response to the instruction information. For example, when detecting a touch operation to instruct the interface to be displayed, the electronic device may display the interface in response to the touch operation; alternatively, when receiving voice information to instruct the interface to be displayed, the electronic device may display the interface in response to the voice information, etc., which is not limited here.

In some implementations, the electronic device may run an application in foreground, and display application contents corresponding to the application. In this case, when a display-container displaying instruction is received during the process of running the application, in response to the display-container displaying instruction, at least one display container may be displayed and the application contents corresponding to the application may be switched to being displayed in the at least one display container. At this time, the electronic device may further display the screen recording control. Alternatively, the electronic device may display the screen recording control when receiving an instruction to display the screen recording control, which is not limited here.

Figure 2:
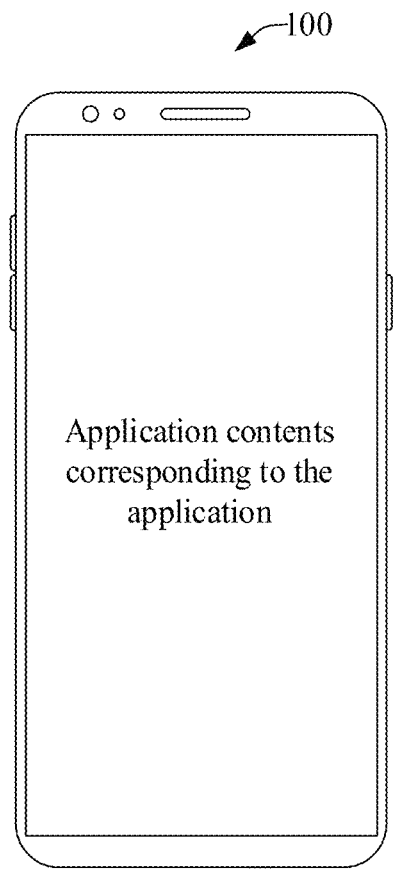
FIG. 2 illustrates a schematic diagram of a first interface of an electronic device provided in an embodiment of the present disclosure.
Figure 3:
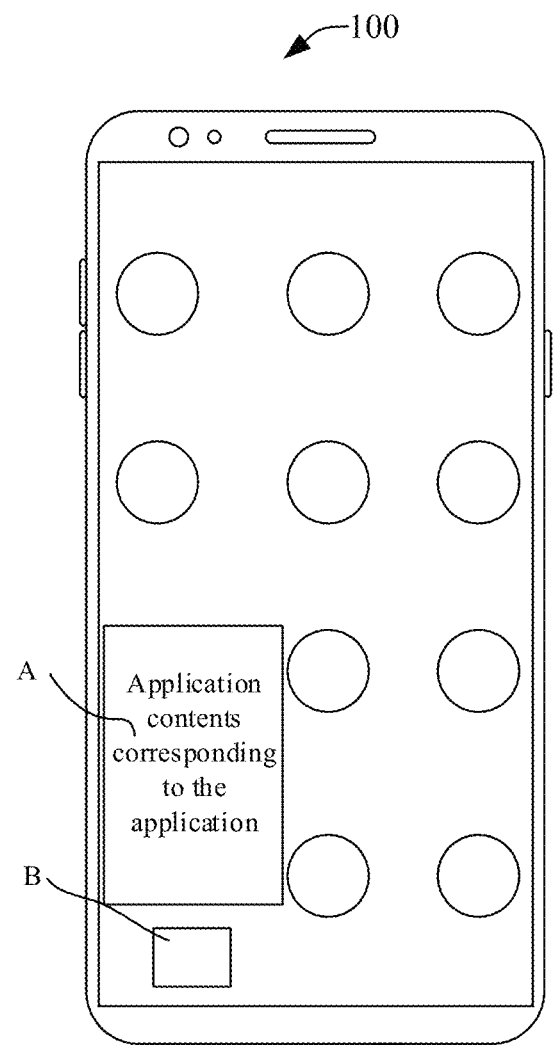
FIG. 3 illustrates a schematic diagram of a second interface of the electronic device provided in an embodiment of the present disclosure.

Referring to FIG. 2 and FIG. 3, a schematic diagram of a first interface of the electronic device provided in the embodiment of the present disclosure is illustrated in FIG. 2, and a schematic diagram of a second interface of the electronic device provided in the embodiment of the present disclosure is illustrated in FIG. 3. As illustrated in FIG. 2, the electronic device may run an application in the foreground and display the application contents corresponding to the application. When a floating-window displaying instruction is received during the process of running the application, in response to the floating-window displaying instruction, at least one floating window is popped up (one floating window is illustrated in the figure as an example), and the application contents corresponding to the application are switched to being displayed in the at least one floating window (as illustrated in FIG. 3). In FIG. 3, "A" represents the floating window, and "B" represents the screen recording control.

Figure 4:
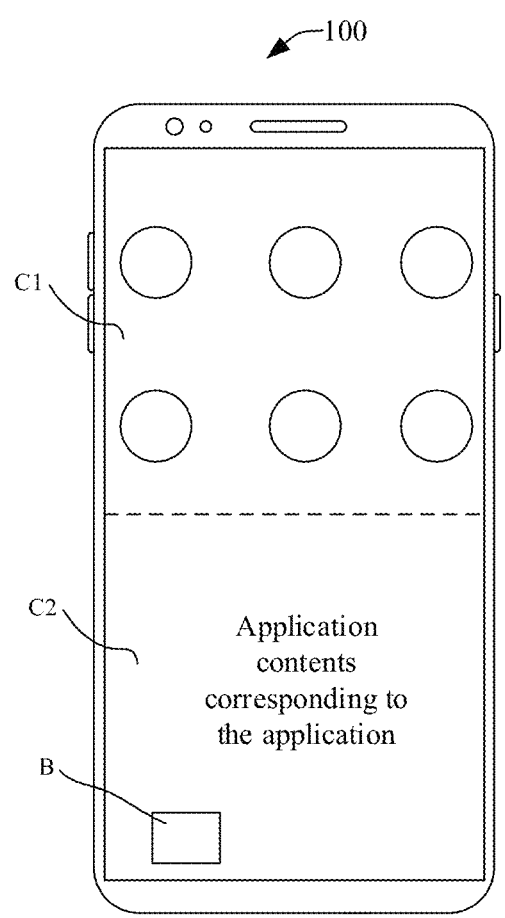
FIG. 4 illustrates a schematic diagram of a third interface of the electronic device provided in an embodiment of the present disclosure.

Referring to FIG. 4, a schematic diagram of a third interface of the electronic device provided in the embodiment of the present disclosure is illustrated in FIG. 4. As illustrated in FIG. 4, when a split-screen displaying instruction is received during the process of running the application, in response to the split-screen displaying instruction, multiple split-screen windows may be displayed (two split-screen windows are illustrated in the figure as an example), and the application contents corresponding to the application are switched to being displayed in one of the split-screen windows. In FIG. 4, "C1" represents a first split-screen window, "C2" represents a second split-screen window, and B represents the screen recording control.

At block S120, a target display container is determined according to a positional relationship between the screen recording control and the at least one display container.

In the embodiment, the positional relationship between the screen recording control and the at least one display container may be acquired, and the target display container may be determined from at least one display container according to the positional relationship between the screen recording control and the at least one display container.

In some implementations, acquiring the positional relationship between the screen recording control and the at least one display container may include: acquiring information indicating whether there is an overlapping area between the screen recording control and the at least one display container; acquiring a size of the overlapping area between the screen recording control and the at least one display container; and acquiring a relative distance between the screen recording control and the at least one display container, which is not limited here. As an implementation, a coordinate system may be established on the interface of the electronic device, coordinate information of the at least one display container may be acquired as first coordinate information, and coordinate information of the screen recording control may be acquired as second coordinate information; and based on the first coordinate information and the second coordinate information, the positional relationship between the screen recording control and the at least one display container may be obtained. As another implementation, a display position of the at least one display container may be acquired as a first display position, and a display position of the screen recording control may be acquired as a second display position; and based on the first display position and the second display position, the positional relationship between the screen recording control and the at least one display container may be obtained.

In some implementations, when the obtained positional relationship between the screen recording control and the at least one display container is a first positional relationship, a first target display container may be determined, based on the first positional relationship, from the at least one display container, and a screen recording area may be determined based on a display area of the first target display container. When the obtained positional relationship between the screen recording control and the at least one display container is a second positional relationship, a second target display container may be determined, based on the second positional relationship, from the at least one display container, and the screen recording area may be determined based on a display area of the second target display container. The first positional relationship is different from the second positional relationship, and the first target display container is different from the second target display container.

In some implementations, when the obtained positional relationship between the screen recording control and the at least one display container is that there is an overlapping area between the screen recording control and the at least one display container, a display container of the at least one display container, that has the overlapping area with the screen recording control, may be determined as the target display container. When the obtained positional relationship between the screen recording control and the at least one display container is that there is no overlapping area between the screen recording control and the at least one display container, a display area corresponding to the interface may be determined as the screen recording area.

At block S130, the screen recording area is determined based on the display area of the target display container.

In the embodiment, after the target display container is determined, the screen recording area may be determined based on the display area of the target display container. As an implementation, after the target display container is determined, the display area of the target display container may be determined as the screen recording area, and the screen recording area increases with the increase of the display area of the target display container, and decreases with the decrease of the display area of the target display container.

In the screen recording method provided in the embodiments of the present disclosure, the interface is displayed, where the interface includes the screen recording control and the at least one display container, and the screen recording control is configured to control recording of the screen contents. The target display container is determined according to the positional relationship between the screen recording control and the at least one display container, and the screen recording area is determined based on the display area of the target display container. As such, the diversity of the screen recording area is increased, and the screen recording experience of the user is improved.

Figure 5:
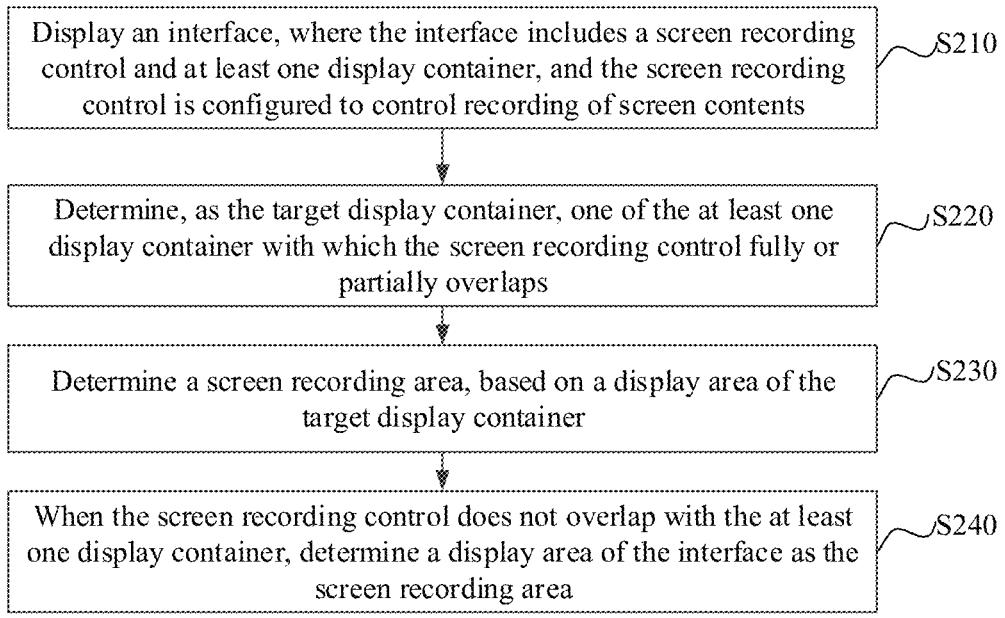
FIG. 5 illustrates a schematic flowchart of a screen recording method provided in another embodiment of the present disclosure.

Referring to FIG. 5, a schematic flowchart of the screen recording method provided in another embodiment of the present disclosure is illustrated. The flow illustrated in FIG. 5 is described in detail below, and the screen recording method may specifically include the following blocks.

At block S210, an interface is displayed, where the interface includes a screen recording control and at least one display container, and the screen recording control is configured to control recording of screen contents.

For the detailed description of block S210, reference may be made to block S110, which will not be repeated here.

At block S220, one of the at least one display container, with which the screen recording control fully or partially overlaps, is determined as the target display container.

In some implementations, after the positional relationship between the screen recording control and the at least one display container is obtained, it may be determined, based on the positional relationship between the screen recording control and the at least one display container, whether there is an overlapping area between at least one display container and the screen recording control. When it is determined that there is an overlapping area between a certain one display container and the screen recording control, that is, when it is determined that the screen recording control fully or partially overlaps a certain one display container, it is indicated that the user desires to record the contents of the certain one display container, and this display container may be determined as the target display container.

Figure 6:
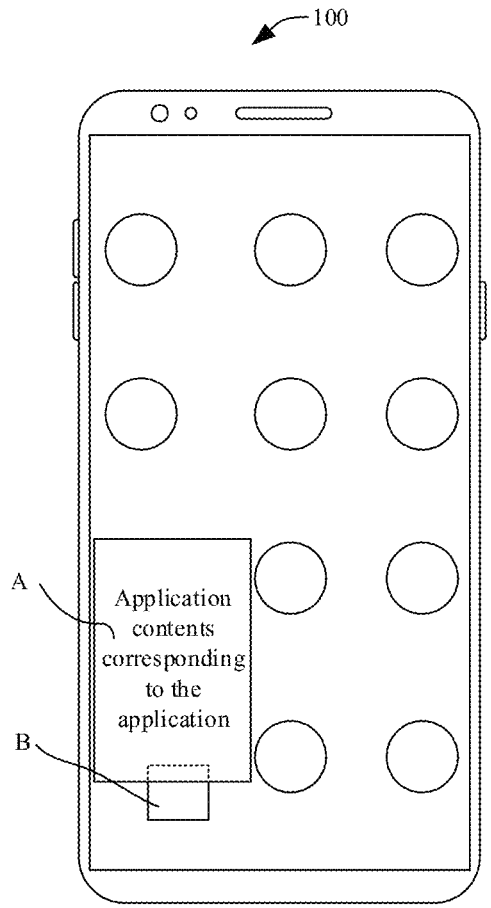
FIG. 6 illustrates a schematic diagram of a fourth interface of the electronic device provided in the embodiment of the present disclosure.

Referring to FIG. 6, a schematic diagram of a fourth interface of the electronic device provided in the embodiment of the present disclosure is illustrated in FIG. 6. As illustrated in FIG. 6, taking a case where the display container is a floating window as an example, when there is an overlapping area between the floating window A and the screen recording control B, the floating window A may be determined as the target display container.

Figure 7:
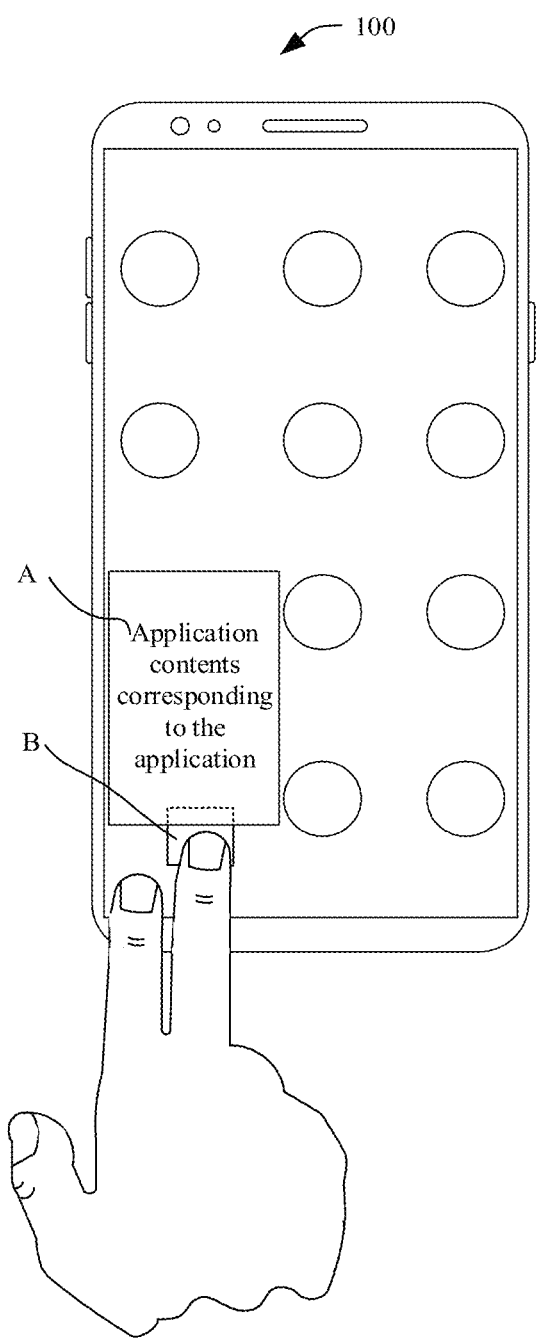
FIG. 7 is a schematic diagram illustrating interaction with the electronic device as provided in an embodiment of the present disclosure.

Referring to FIG. 7, a schematic diagram illustrating interaction with the electronic device provided in an embodiment of the present disclosure is shown in FIG. 7. As illustrated in FIG. 7, when a drag operation performed on the screen recording control B is detected, in response to the drag operation performed on the screen recording control B, the screen recording control B may be controlled to move with the drag operation; and when the screen recording control B is moved to a position where the screen recording control B has an overlapping area with the floating window A, the floating window A may be determined as the target display container.

Figure 8:
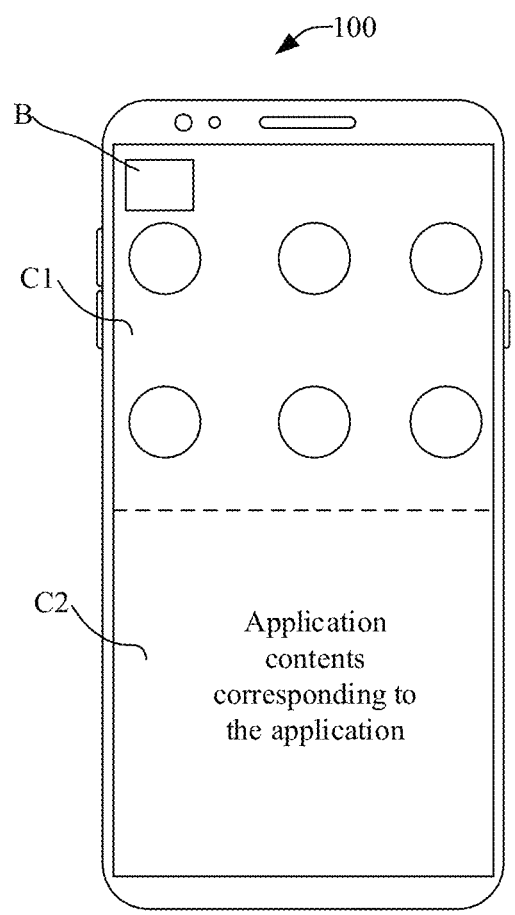
FIG. 8 illustrates a schematic diagram of a fifth interface of the electronic device provided in an embodiment of the present disclosure.

Referring to FIG. 8, a schematic diagram of a fifth interface of the electronic device provided in the embodiment of the present disclosure is illustrated in FIG. 8. As illustrated in FIG. 8, taking a case where the display container is a split-screen window as an example, when there is an overlapping area between the split-screen window C1 and the screen recording control B, the split-screen window C1 may be determined as the target display container.

At block S230, a screen recording area is determined based on a display area of the target display container.

For the detailed description of block S230, reference may be made to block S130, which will not be repeated here.

At block S240, when the screen recording control does not overlap with the at least one display container, a display area of the interface is determined as the screen recording area.

In some implementations, after the positional relationship between the screen recording control and the at least one display container is obtained, it may be determined, based on the positional relationship between the screen recording control and the at least one display container, whether there is an overlapping area between at least one display container and the screen recording control. When it is determined that there is no overlapping area between the at least one display container and the screen recording control, it is indicated that the user desires to record the contents of the interface, and the display area of the interface may be determined as the screen recording area.

In some implementations, when the display area of the interface is determined as the screen recording area, the screen contents in the interface may be recorded to record all the contents of the interface.

In some implementations, when the display area of the interface is determined as the screen recording area, the screen contents in the interface may be recorded with the screen recording control and the at least one display container concealed, to selectively record part of the contents of the interface. As an implementation, when the display area of the interface is determined as the screen recording area, the at least one display container and the screen recording control may still be displayed normally on the interface; and during the recording of the screen contents of the interface, the at least one display container and the screen recording control may not be recorded, that is, the screen contents in the interface, excepting the screen recording control and the at least one display container, may be recorded.

In the screen recording method provided in another embodiment of the present disclosure, the interface is displayed, where the interface includes the screen recording control and the at least one display container, and the screen recording control is configured to control recording of the screen contents. One of the at least one display container, with which the screen recording control fully or partially overlaps, is determined as the target display container, and the screen recording area is determined based on the display area of the target display container. When the screen recording control does not overlap with the at least one display container, the display area of the interface is determined as the screen recording area. Compared with the screen recording method illustrated in FIG. 1, in the embodiment, one of the at least one display container, with which the screen recording control fully or partially overlaps, is determined as the target display container, and the display area of this target display container is determined as the screen recording area; as thus, the convenience and accuracy of determining the screen recording area is improved. In addition, in the embodiment, when the screen recording control does not overlap with the at least one display container, the display area of the interface is determined as the screen recording area, which increases the diversity of the screen recording area.

Figure 9:
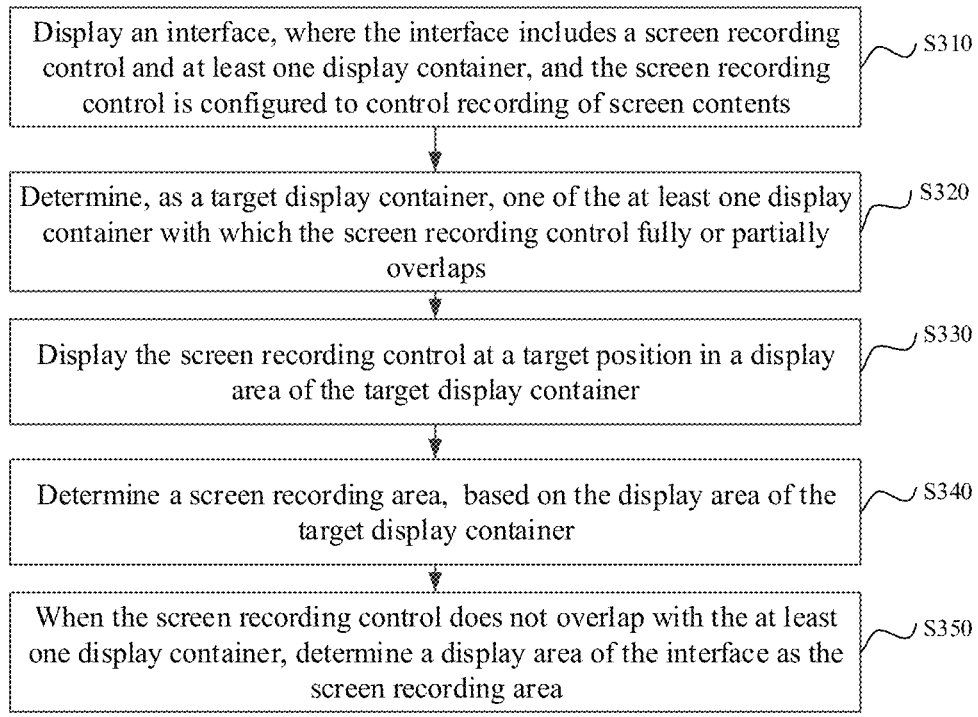
FIG. 9 illustrates a schematic flowchart of a screen recording method provided in a further embodiment of the present disclosure.

Referring to FIG. 9, a schematic flowchart of a screen recording method provided in a further embodiment of the present disclosure is illustrated in FIG. 9. The flow illustrated in FIG. 9 is described in detail below, and the screen recording method may specifically include the following blocks.

At block S310, an interface is displayed, where the interface includes a screen recording control and at least one display container, and the screen recording control is configured to control recording of screen contents.

For the detailed description of block S310, reference may be made to block S110, which will not be repeated here.

At block S320, one of the at least one display container, with which the screen recording control fully or partially overlaps, is determined as a target display container.

For the detailed description of block S320, reference may be made to block S220, which will not be repeated here.

At block S330, the screen recording control is displayed at a target position in the display area of the target display container.

In the embodiment, after the target display container is determined from the at least one display container, the screen recording control may be displayed in the display area of the target display container to mark the target display container, which facilitates the user to directly invoke and use the screen recording control.

In some implementations, when the screen recording control is displayed in the target display container, the display parameter(s) of the screen recording control may be kept unchanged, or may be changed. For example, the display parameters of the screen recording control may be simplified to reduce the influence on the display contents in the target display container, which is not limited here.

In some implementations, a target position may be preset in the display area of the target display container and stored, and the target position is configured for display of the screen recording control. That is, when the screen recording control is displayed in the target display container, the screen recording control may always be displayed at the target position, so as to reduce the influence on the display contents in the target display container. As an implementation, the target position may be a lower left corner, a lower right corner or the like of the display area of the target display container, which is not limited here.

Figure 10:
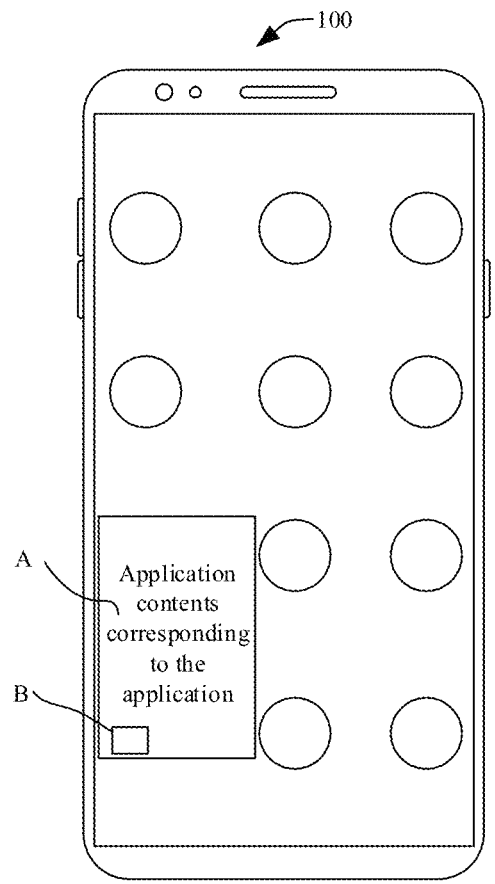
FIG. 10 illustrates a schematic diagram of a sixth interface of the electronic device provided in an embodiment of the present disclosure.

Referring to FIG. 10, a schematic diagram of a sixth interface of the electronic device provided in the embodiment of the present disclosure is illustrated in FIG. 10. As illustrated in FIG. 10, taking a case where the target display container is the floating window A as an example, the screen recording control B may be displayed in the lower left corner of the floating window A.

At block S340, a screen recording area is determined based on the display area of the target display container.

For the detailed description of block S340, reference may be made to block S130, which will not be repeated here.

At block S350, when the screen recording control does not overlap with the at least one display container, a display area of the interface is determined as the screen recording area.

For the detailed description of block S350, reference may be made to block S240, which will not be repeated here.

In the screen recording method provided in the further embodiment of the present disclosure, the interface is displayed, where the interface includes the screen recording control and the at least one display container, and the screen recording control is configured to control recording of screen contents. One of the at least one display container, with which the screen recording control fully or partially overlaps, is determined as the target display container. The screen recording control is displayed at the target position in the display area of the target display container. The screen recording area is determined based on the display area of the target display container. When the screen recording control does not overlap with the at least one display container, the display area of the interface is determined as the screen recording area. Compared with the screen recording method illustrated in FIG. 1, in the embodiment, one of the at least one display container, with which the screen recording control fully or partially overlaps, is determined as the target display container, and the display area of the target display container is determined as the screen recording area; as thus, the convenience and accuracy of determining the screen recording area is improved. Furthermore, in the embodiment, when the screen recording control does not overlap with the at least one display container, the display area of the interface is further determined as the screen recording area, which increases the diversity of the screen recording area. In addition, in the embodiment, the screen recording control is further displayed at the target position in the display area of the target display container, which facilitates the user to invoke and operate the screen recording control during the screen recording process, and improves the user's experience.

Figure 11:
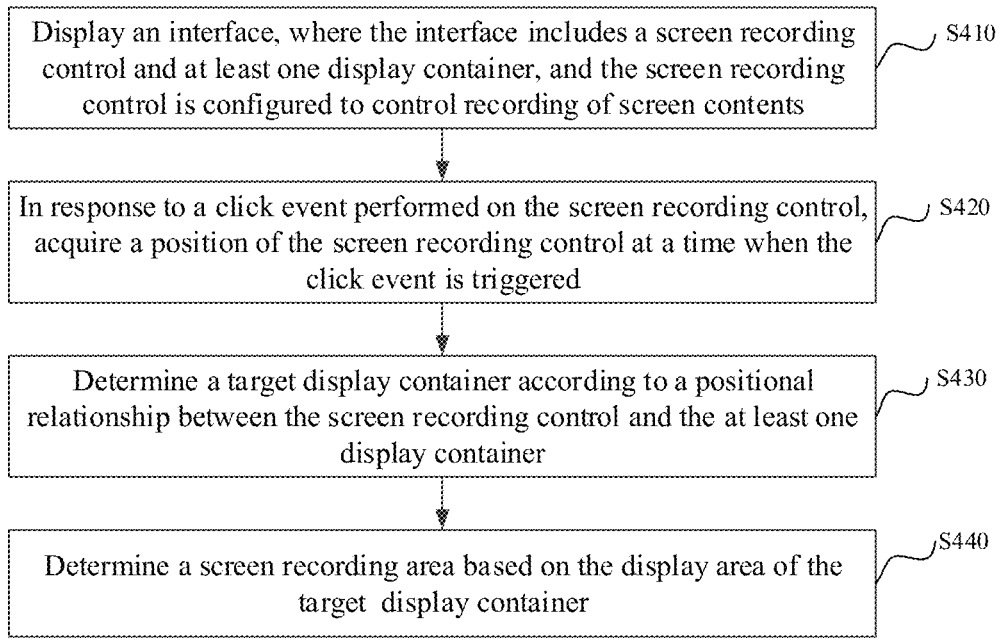
FIG. 11 illustrates a schematic flowchart of a screen recording method provided in yet a further embodiment of the present disclosure.

Referring to FIG. 11, a schematic flowchart of a screen recording method provided in yet a further embodiment of the present disclosure is illustrated in FIG. 11. The flow illustrated in FIG. 11 is described in detail below, and the screen recording method may specifically include the following blocks.

At block S410, an interface is displayed, where the interface includes a screen recording control and at least one display container, and the screen recording control is configured to control recording of screen contents.

For the detailed description of block S410, reference may be made to block S110, which will not be repeated here.

At block S420, in response to a click event performed on the screen recording control, a position of the screen recording control at a time when the click event is triggered is acquired.

In some implementations, during the process of displaying the interface, the electronic device may detect the click event performed on the screen recording control. When the click event performed on the screen recording control is detected, in response to the click event, the position of the screen recording control at the time when the click invent is triggered may be acquired, so as to determine, according to the position of the screen recording control, the positional relationship between the screen recording control and the at least one display container at the time when the click event occurs. That is, the determination of the target display container is triggered by the occurrence of the click event.

At block S430, a target display container is determined according to the positional relationship between the screen recording control and the at least one display container.

At block S440, a screen recording area is determined based on a display area of the target display container.

For the detailed description of block S430 to block S440, reference may be made to block S120 to block S130, which will not be repeated here.

In the screen recording method provided in yet a further embodiment of the present disclosure, the interface is displayed, where the interface includes the screen recording control and the at least one display container, and the screen recording control is configured to control recording of the screen contents. In response to the click event performed on the screen recording control, the position of the screen recording control at the time when the click event is triggered is acquired. The target display container is determined according to the positional relationship between the screen recording control and the at least one display container, and the screen recording area is determined based on the display area of the target display container. Compared with the screen recording method illustrated in FIG. 1, in the embodiment, in response to the click event performed on the screen recording control, the position of the screen recording control at the time when the click event is triggered is acquired, which enables the screen recording to be triggered according to a click operation.

Figure 12:
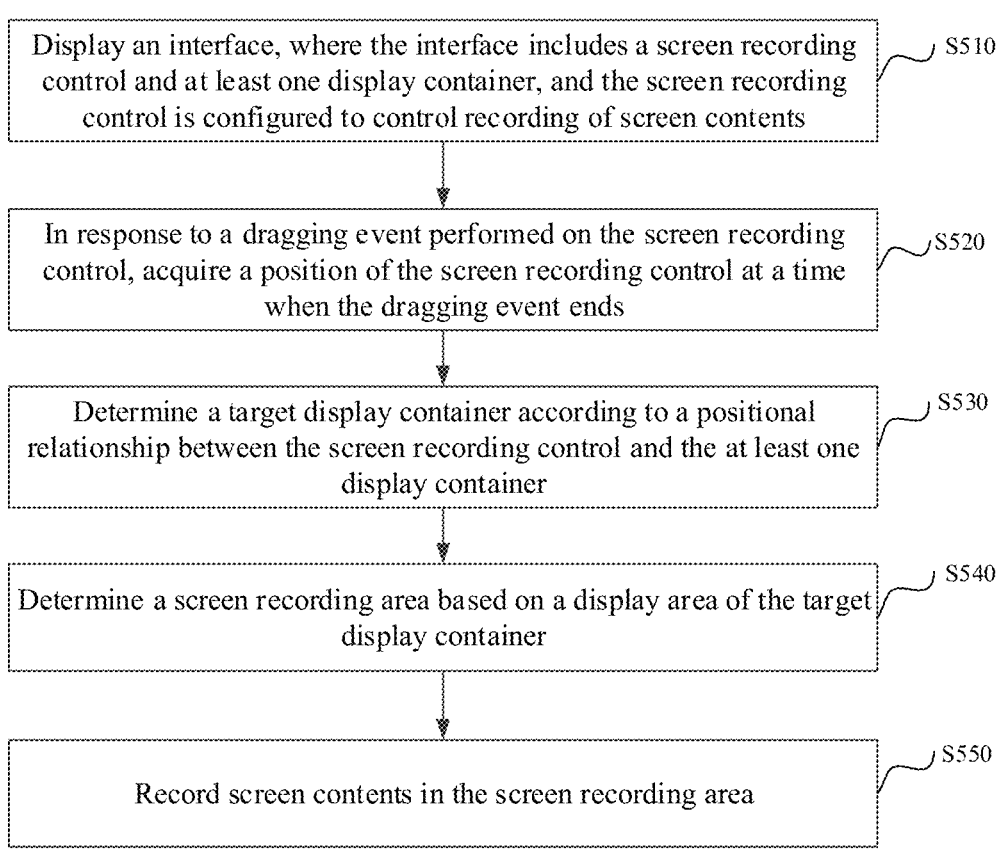
FIG. 12 illustrates a schematic flowchart of a screen recording method provided in yet a still further embodiment of the present disclosure.

Referring to FIG. 12, a schematic flowchart of a screen recording method provided in yet a still further embodiment of the present disclosure is illustrated in FIG. 12. The flow illustrated in FIG. 12 is described in detail below, and the screen recording method may specifically include the following blocks.

At block S510, an interface is displayed, where the interface includes a screen recording control and at least one display container, and the screen recording control is configured to control recording of screen contents.

For the detailed description of block S510, reference may be made to block S110, which is not repeated here.

At block S520, in response to a dragging event performed on the screen recording control, a position of the screen recording control at a time when the dragging event ends is acquired.

In some implementations, during the process of displaying the interface, the electronic device may detect the dragging event performed on the screen recording control. When the dragging event performed on the screen recording control is detected, in response to the dragging event, the position of the screen recording control at the time when the dragging event ends may be acquired, so as to determine, according to the position of the screen recording control, the positional relationship between the screen recording control and the at least one display container at the time when the dragging event ends. That is, the determination of the target display container is triggered by the ending of the dragging event.

At block S530, a target display container is determined according to the positional relationship between the screen recording control and the at least one display container.

At block S540, a screen recording area is determined based on a display area of the target display container.

For the detailed description of blocks S530 to S540, reference may be made to blocks S120 to S130, which will not be repeated here.

At block S550, the screen contents in the screen recording area are recorded.

In some implementations, after the screen recording area is determined based on the display area of the target display container, the screen contents in the screen recording area may be recorded directly, so that the user may record the contents of a certain application while performing other operations, which improves the convenience of the trigger of recording the screen.

Figure 13:
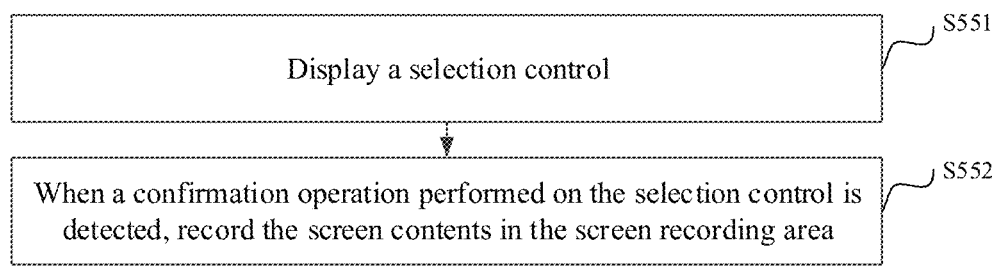
FIG. 13 illustrates a schematic flowchart for block S550 of the screen recording method illustrated in FIG. 12 of the present disclosure.

Referring to FIG. 13, a schematic flowchart of block S550 of the screen recording method illustrated in FIG. 12 of the present disclosure is illustrated in FIG. 13. The flow illustrated in FIG. 13 is described in detail below, and the method may specifically include the following blocks.

At block S551, a selection control is displayed.

In some implementations, after the dragging event ends and the screen recording area is determined based on the display area of the target display container determined through the dragging event, a selection control may be displayed, where the selection control is configured to enable the user to select whether to record screen contents in the determined screen recording area.

Figure 14:
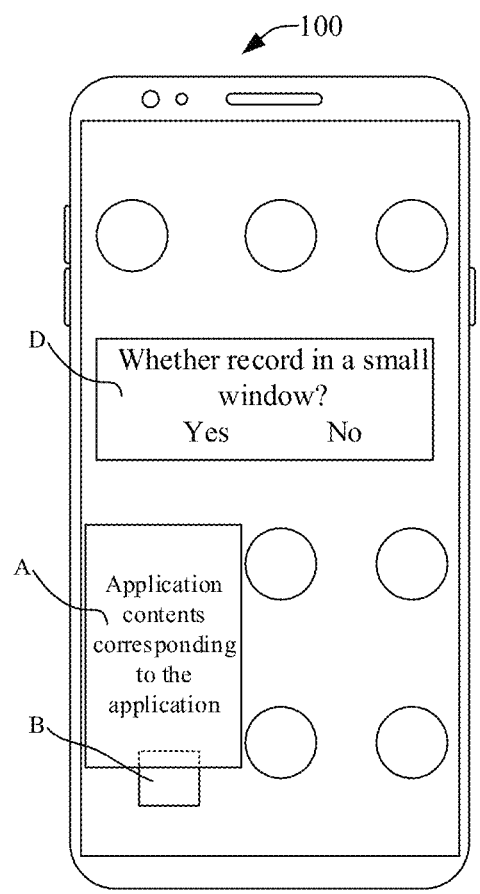
FIG. 14 illustrates a schematic diagram of a seventh interface of the electronic device provided in the embodiment of the present disclosure.

Referring to FIG. 14, a schematic diagram of a seventh interface of the electronic device provided in the embodiment of the present disclosure is illustrated in FIG. 14. As illustrated in FIG. 14, taking a case where the target display container is floating window A as an example, when the screen recording control B is moved, based on a dragging event, to a position where the screen recording control B has an overlapping area with the floating window A, a selection control D may be displayed.

At block S552, when a confirmation operation performed on the selection control is detected, the screen contents in the screen recording area are recorded.

In some implementations, during the process of displaying the selection control, a touch operation performed on the selection control may be detected. When the confirmation operation performed on the selection control is detected, it is indicated that the user desires to record the contents of the screen recording area, and it may start the recording of the screen contents in the screen recording area. When a cancellation operation performed on the selection control is detected, it is indicated that the drag operation is a misoperation, and the screen recording may be canceled or the display area of the interface may be determined as the screen recording area.

In the screen recording method provided in yet a still further embodiment of the present disclosure, the interface is displayed, where the interface includes the screen recording control and the at least one display container, and the screen recording control is configured to control recording of the screen contents. In response to the dragging event performed on the screen recording control, the position of the screen recording control at the time when the dragging event ends is acquired. The target display container is determined according to the positional relationship between the screen recording control and the at least one display container. The screen recording area is determined based on the display area of the target display container, and the screen contents in the screen recording area are recorded. Compared with the screen recording method illustrated in FIG. 1, in the embodiment, in response to the dragging event performed on the screen recording control, the position of the screen recording control at the time when the dragging event ends is acquired, so as to enable the screen recording to be triggered according to the drag operation.

Figure 15:
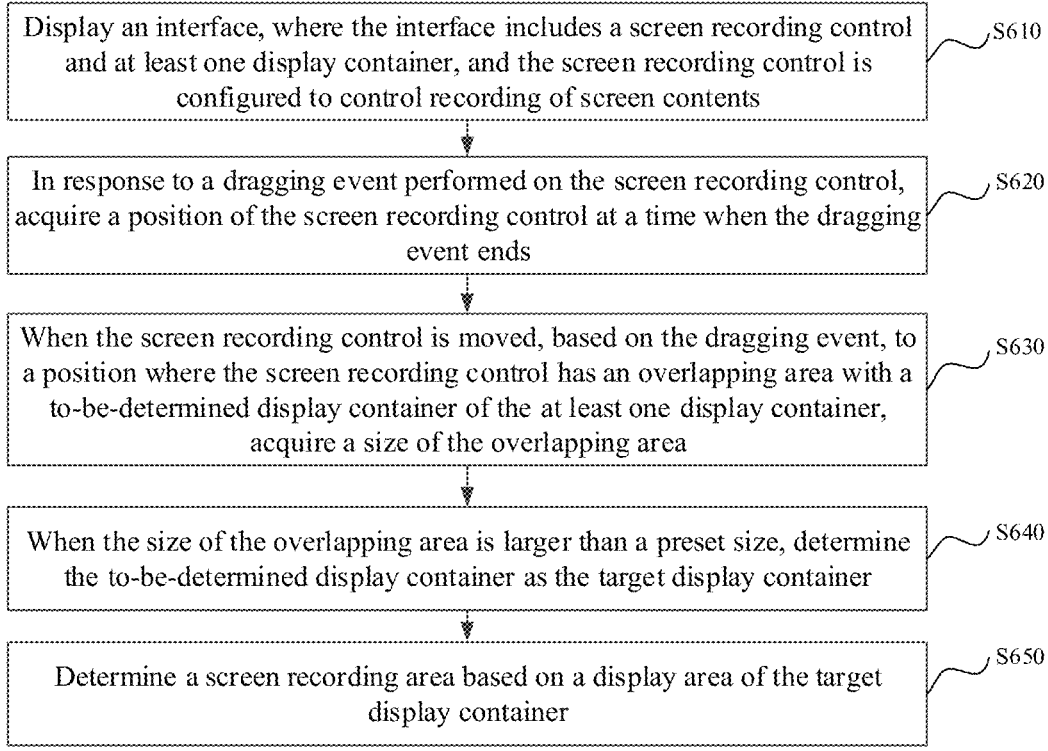
FIG. 15 illustrates a schematic flowchart of a screen recording method provided in yet a still further embodiment of the present disclosure.

Referring to FIG. 15, a schematic flowchart of the screen recording method provided in yet a still further embodiment of the present disclosure is illustrated in FIG. 15. The flow illustrated in FIG. 15 is described in detail below, and the screen recording method may specifically include the following blocks.

At block S610, an interface is displayed, where the interface includes a screen recording control and at least one display container, and the screen recording control is configured to control recording of screen contents.

For the detailed description of block S610, reference may be made to block S110, which will not be repeated here.

At block S620, in response to a dragging event performed on the screen recording control, a position of the screen recording control at a time when the dragging event ends is acquired.

For the detailed description of block S620, reference may be made to block S520, which will not be repeated here.

At block S630, in response to the screen recording control being moved, based on the dragging event, to a position where the screen recording control has an overlapping area with a to-be-determined display container of the at least one display container, a size of the overlapping area is acquired.

In some implementations, during the movement of the screen recording control based on the dragging event, the positional relationship between the screen recording control and the at least one display container may be obtained, and it may be determined, based on the positional relationship between the screen recording control and the at least one display container, whether there is an overlapping area between the screen recording control and the at least one display container. When it is determined that there is an overlapping area between the screen recording control and the to-be-determined display container of the at least one display container, the size of the overlapping area between the screen recording control and the to-be-determined display container may be acquired.

In some implementations, when it is determined that there is an overlapping area between the screen recording control and the to-be-determined display container, the coordinate information of the to-be-determined display container may be acquired as first coordinate information, and the coordinate information of the screen recording control may be acquired as the second coordinate information. Coordinate information of the overlapping area may be obtained based on the first coordinate information and the second coordinate information, and the size of the overlapping area may be obtained based on the coordinate information of the overlapping area.

At block S640, when the size of the overlapping area is larger than a preset size, the to-be-determined display container is determined as the target display container.

In some implementations, the preset size may be preset and stored in the electronic device, and the preset size is used as a determination basis for the size of the overlapping area. Therefore, in the embodiment, after obtaining the size of the overlapping area between the screen recording control and the to-be-determined display container, the size of the overlapping area may be compared with the preset size to determine whether the size of the overlapping area is greater than the preset size. As an implementation, when the size of the overlapping area is larger than the preset size, it is indicated that there is low probability of a misoperation, and the to-be-determined display container may be determined as the target display container. As an implementation, when the size of the overlapping area is not greater than the preset size, it is indicated that there would be high probability of a misoperation, the to-be-determined display container may not be determined as the target display container, and it may continue to acquire the size of the overlapping area between the screen recording control and the at least one display container.

At block S650, a screen recording area is determined based on a display area of the target display container.

For the detailed description of block S650, reference may be made to block S130, which will not be repeated here.

In the screen recording method provided in the yet a still further embodiment of the present disclosure, the interface is displayed, where the interface includes the screen recording control and the at least one display container, and the screen recording control is configured to control recording of the screen contents. In response to the dragging event performed on the screen recording control, the position of the screen recording control at the time when the dragging event ends is acquired. When the screen recording control is moved, based on the dragging event, to a position where the screen recording control has an overlapping area with a to-be-determined display container of the at least one display container, the size of the overlapping area is acquired. When the size of the overlapping area is larger than a preset size, the to-be-determined display container is determined as the target display container, and the screen recording area is determined based on the display area of the target display container. Compared with the screen recording method illustrated in FIG. 1, in the embodiment, in response to the dragging event performed on the screen recording control, the position of the screen recording control at the time when the dragging event ends is acquired, so as to enable the screen recording to be triggered according to the drag operation. In addition, in the embodiment, the to-be-determined display container is determined as the target display container when the size of the overlapping area between the screen recording control and the to-be-determined display container is larger than the preset size, which reduces the probability of misoperation.

Figure 16:
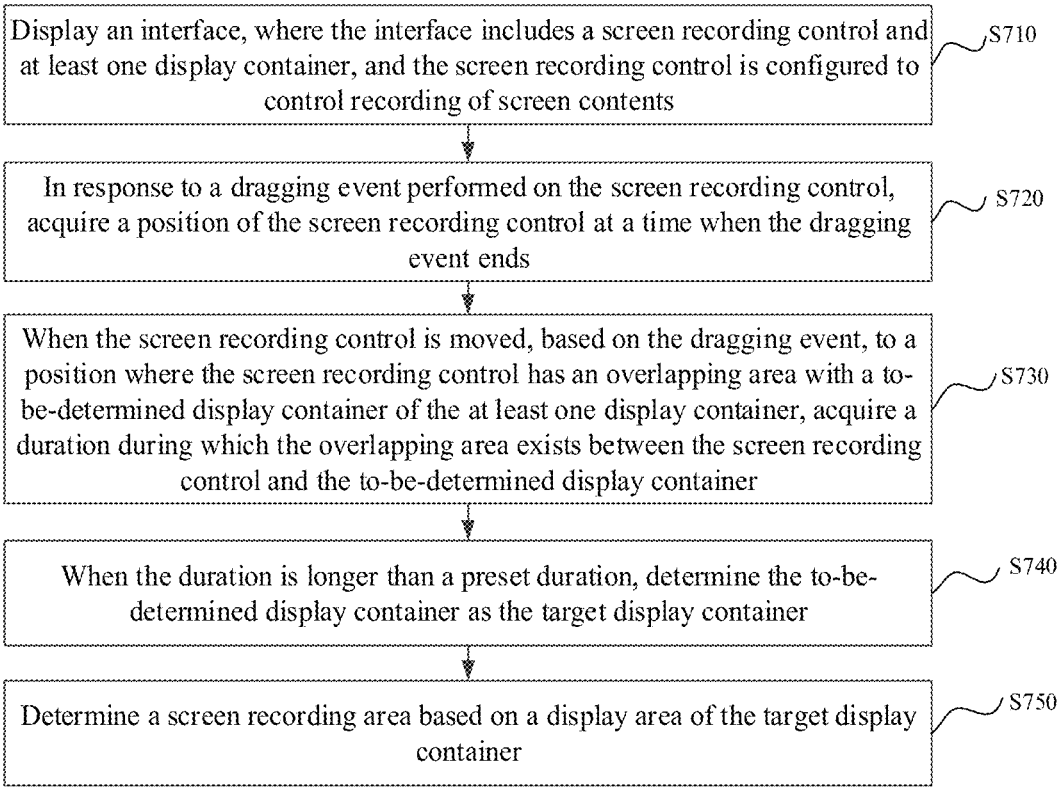
FIG. 16 illustrates a schematic flowchart of a screen recording method provided in yet a still further embodiment of the present disclosure.

Referring to FIG. 16, a schematic flowchart of the screen recording method provided in yet a still further embodiment of the present disclosure is illustrated in FIG. 16. The flow illustrated in FIG. 16 is described in detail below, and the screen recording method may specifically include the following blocks.

At block S710, an interface is displayed, where the interface includes a screen recording control and at least one display container, and the screen recording control is configured to control recording of screen contents.

For the detailed description of block S710, reference may be made to block S110, which will not be repeated here.

At block S720, in response to a dragging event performed on the screen recording control, a position of the screen recording control at a time when the dragging event ends is acquired.

For the detailed description of block S720, reference may be made to block S520, which will not be repeated here.

At block S730, in response to the screen recording control is moved, based on the dragging event, to a position where the screen recording control has an overlapping area with a to-be-determined display container of the at least one display container, a duration during which the overlapping area exists between the screen recording control and the to-be-determined display container is acquired.

In some implementations, during the movement of the screen recording control based on the dragging event, the positional relationship between the screen recording control and the at least one display container may be acquired, and it may be determined, based on the positional relationship between the screen recording control and the at least one display container, whether there is an overlapping area between the screen recording control and the at least one display container. When it is determined, based on the positional relationship between the screen recording control and the at least one display container, that there is an overlapping area between the screen recording control and a to-be-determined display container, the duration during which the overlapping area exists between the screen recording control and the to-be-determined display container may be acquired.

As an implementation, the electronic device may start a timer when detecting, during the movement of the screen recording control, that the screen recording control begins to have an overlapping area with the to-be-determined display container, and acquire, through the timer, the duration during which the overlapping area exists between the screen recording control and the to-be-determined display container.

At block S740, when the duration is longer than a preset duration, the to-be-determined display container is determined as the target display container.

In some implementations, the preset duration may be preset and stored in the electronic device, and the preset duration is used as a determination basis for the duration of the overlapping area between the screen recording control and the to-be-determined display container. Therefore, in the embodiment, after acquiring the duration during which the overlapping area exists between the screen recording control and the to-be-determined display container, the duration may be compared with the preset duration to determine whether the duration is longer than the preset duration. As an implementation, when the duration is longer than the preset duration, it is indicated that there is low probability of a misoperation, and the to-be-determined display container may be determined as the target display container. As an implementation, when the duration is not longer than the preset duration, it is indicated that there is high probability of a misoperation, the to-be-determined display container may not be determined as the target display container, and it may continue to acquire the duration during which the overlapping area exists between the screen recording control and the at least one display container.

At block S750, a screen recording area is determined based on a display area of the target display container.

For the detailed description of block S750, reference may be made to block S130, which will not be repeated here.

In the screen recording method provided in yet a still further embodiment of the present disclosure, the interface is displayed, where the interface includes the screen recording control and the at least one display container, and the screen recording control is configured to control recording of the screen contents. In response to the dragging event performed on the screen recording control, the position of the screen recording control at the time when the dragging event ends is acquired. When the screen recording control is moved, based on the dragging event, to a position where the screen recording control has an overlapping area with a to-be-determined display container of the at least one display container, the duration during which the overlapping area exists between the screen recording control and the to-be-determined display container is acquired. When the duration is longer than the preset duration, the to-be-determined display container is determined as the target display container, and the screen recording area is determined based on the display area of the target display container. Compared with the screen recording method illustrated in FIG. 1, in the embodiment, in response to the dragging event performed on the screen recording control, the position of the screen recording control at the time when the dragging event ends is acquired, so as to enable the screen recording to be triggered according to a drag operation. In addition, in the embodiment, when the duration during which the overlapping area exists between the screen recording control and the to-be-determined display container is longer than the preset duration, the to-be-determined display container is determined as the target display container, which reduces the probability of misoperation.

Figure 17:
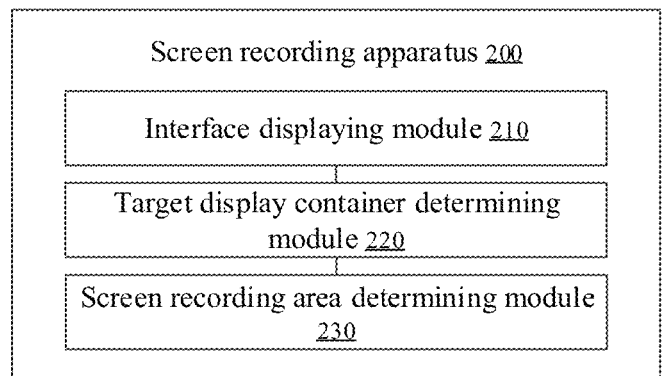
FIG. 17 illustrates a block diagram of a screen recording apparatus provided in an embodiment of the present disclosure.

Referring to FIG. 17, a block diagram of a screen recording apparatus provided in an embodiment of the present disclosure is illustrated in FIG. 17. The block diagram illustrated in FIG. 17 is described below. The screen recording apparatus 200 includes an interface displaying module 210, a target display container determining module 220 and a screen recording area determining module 230.

The interface displaying module 210 is configured to display an interface, where the interface includes a screen recording control and at least one display container, and the screen recording control is configured to control recording of screen contents.

The target display container determining module 220 is configured to determine a target display container according to a positional relationship between the screen recording control and the at least one display container.

Further, the target display container determining module 220 further includes a first target display container determining sub-module.

The first target display container determining sub-module is configured to determine, as the target display container, one of the at least one display container with which the screen recording control fully or partially overlaps.

Further, the target display container determining module 220 further includes a screen recording area determining sub-module.

The screen recording area determining sub-module is configured to determine a display area of the interface as a screen recording area, when the screen recording control does not overlap with the at least one display container.

Further, the target display container determining module 220 includes a size acquisition sub-module and a second target display container determining sub-module.

The size acquisition sub-module is configured to, when the screen recording control is moved, based on a dragging event, to a position where the screen recording control has an overlapping area with a to-be-determined display container of the at least one display container, acquire a size of the overlapping area.

The second target display container determining sub-module is configured to determine the to-be-determined display container as the target display container, when the size of the overlapping area is larger than a preset size.

Further, the target display container determining module 220 includes a duration acquisition sub-module and a third target display container determining sub-module.

The duration acquisition sub-module is configured to when the screen recording control is moved, based on a dragging event, to a position where the screen recording control has an overlapping area with a to-be-determined display container of the at least one display container, acquire a duration during which the overlapping area exists between the screen recording control and the to-be-determined display container.

The third target display container determining sub-module is configured to determine the to-be-determined display container as the target display container, when the duration is longer than a preset duration.

The screen recording area determining module 230 is configured to determine a screen recording area based on a display area of the target display container.

Further, the screen recording apparatus 200 further includes a screen recording control displaying module.

The screen recording control displaying module is configured to display the screen recording control at a target position in the display area of the target display container.

Further, the screen recording apparatus 200 further includes a position acquisition module.

The position acquisition module is configured to acquire a position of the screen recording control on the interface.

Further, the position acquisition module includes a first position acquisition sub-module.

The first position acquisition sub-module is configured to acquire, in response to a click event performed on the screen recording control, the position of the screen recording control at a time when the click event is triggered.

Further, the position acquisition module includes a second position acquisition sub-module.

The second position acquisition sub-module is configured to acquire, in response to a dragging event performed on the screen recording control, the position of the screen recording control at a time when the dragging event ends.

Further, the screen recording apparatus 200 further includes a screen content recording module.

The screen content recording module is configured to record screen contents in the screen recording area.

Further, the screen content recording module includes a selection control displaying sub-module and a screen content recording sub-module.

The selection control displaying sub-module is configured to display a selection control.

The screen content recording sub-module is configured to record the screen contents in the screen recording area, when a confirmation operation performed on the selection control is detected.

It may be clearly understandable for those skilled in the art that, for the convenience and conciseness of description, the specific working processes of the apparatus and modules described above may refer to the corresponding processes in the aforementioned method embodiments, which will not be repeated here.

In several embodiments provided in the disclosure, the coupling between the modules may be electrical, mechanical or in other forms.

In addition, individual functional modules provided in each embodiment of the present disclosure may be integrated into one processing module, or each module may exist physically alone, or two or more modules may be integrated into one module. The above integrated modules may be implemented in the form of hardware or in the form of software functional modules.

Figure 18:
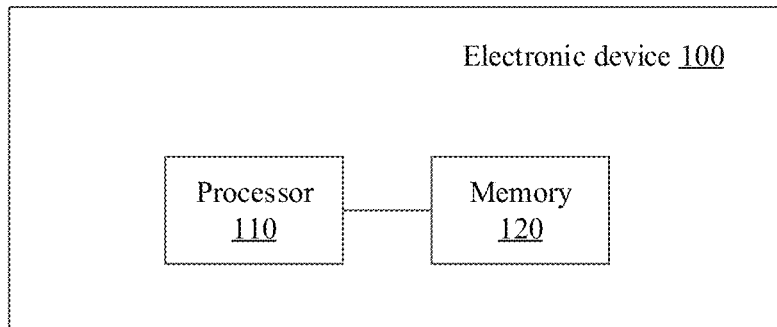
FIG. 18 illustrates a block diagram of an electronic device that executes the screen recording method provided in an embodiment of the present disclosure.

Referring to FIG. 18, a structural block diagram of an electronic device 100 provided in an embodiment of the present disclosure is illustrated. The electronic device 100 may be a smart phone, a tablet computer, an e-book and other electronic devices capable of running an application. The electronic device 100 provided in the disclosure may include one or more of the following components: a processor 110, a memory 120, and one or more applications, where the one or more applications may be stored in the memory 120 and configured to be executed by the one or more processors 110. The one or more programs are configured to perform the method as described in the aforementioned method embodiments.

The processor 110 may include one or more processing cores. The processor 110 connects various parts of the whole electronic device 100 through various interfaces and lines, and executes various functions and processes data of the electronic device 100 by running or executing instructions, programs, code sets or instruction sets stored in the memory 120, and calling data stored in the memory 120. Alternatively, the processor 110 may be implemented in at least one hardware form of Digital Signal Processing (DSP), Field-Programmable Gate Array (FPGA) and Programmable Logic Array (PLA). The processor 110 may be integrated with one or a combination of Central Processing Unit (CPU), Graphics Processing Unit (GPU), and modem, etc. The CPU mainly handles the operating system, user interface and applications, etc. The GPU is configured to render and draw the contents to be displayed. The modem is configured to handle wireless communication. It is understandable that the modem above may be implemented by a communication chip without being integrated into the processor 110.

The memory 120 may include a Random Access Memory (RAM), and may also include a Read-Only Memory (ROM). The memory 120 may be configured to store instructions, programs, codes, code sets or instruction sets. The memory 120 may include a program storage area and a data storage area, where the program storage area may store instructions for implementing the operating system, instructions for implementing at least one function (such as a touch function, a sound playing function, an image displaying function, etc.), and instructions for implementing various method embodiments described below. The data storage area may further store data (such as phone book, audio and video data, chat record data) created during the use of the electronic device 100 and the like.

Figure 19:
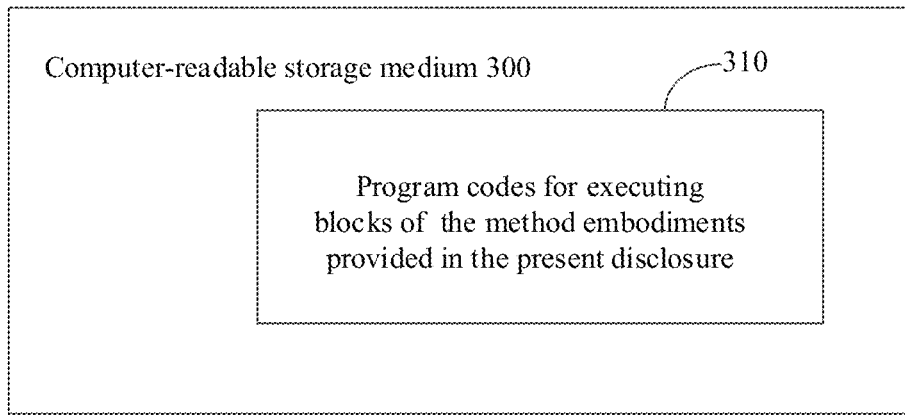
FIG. 19 illustrates a storage unit for storing or carrying program codes for implementing the screen recording method provided in an embodiment of the present disclosure.

Referring to FIG. 19, a structural block diagram of a computer-readable storage medium provided in an embodiment of the present disclosure is illustrate. Program codes are stored in the computer-readable storage medium 300, and the program code may be invoked by a processor to implement the method described in the above method embodiments.

The computer-readable storage medium 300 may be an electronic memory, such as flash memory, EEPROM (Electrically Erasable Programmable Read Only Memory), EPROM, hard disk or ROM. Alternatively, the computer-readable storage medium 300 includes a non-transitory computer-readable storage medium. The computer-readable storage medium 300 has a storage space for program codes 310 for executing any method block in the above methods. These program codes may be read from or written into one or more computer program products. The program codes 310 may be compressed for example in an appropriate form.

In summary, in the screen recording method and apparatus, electronic device, and storage medium provided in the embodiments of the present disclosure, an interface is displayed, where the interface includes a screen recording control and at least one display container, and the screen recording control is configured to control recording of screen contents. A target display container is determined according to a positional relationship between the screen recording control and the at least one display container. A screen recording area is determined based on a display area of the target display container. That is, the target display container is determined based on the positional relationship between the screen recording control and the at least one display container, and the screen recording area is determined based on the display area of the target display container. In this way, the diversity of the screen recording area is increased, and the screen recording experience of the user is improved.

Finally, it is notable that the above embodiments are only used to illustrate the technical solutions of the present disclosure, rather than limiting them. Although the present disclosure has been described in detail with reference to the foregoing embodiments, it is understandable for those of ordinary skill in the art that: the technical solutions

What is claimed is:

1. A screen recording method, comprising:
 displaying an interface, wherein the interface comprises a screen recording control and at least one display container, and the screen recording control is configured to control recording of dynamic screen contents;
 determining a target display container according to a positional relationship between the screen recording control and the at least one display container, comprising:
  determining, as the target display container, one of the at least one display container with which the screen recording control fully or partially overlaps;
 determining a screen recording area based on a display area of the target display container; and
 recording dynamic screen contents in the screen recording area;
 wherein the method further comprises:
  in response to the screen recording control not overlapping with the at least one display container, determining a display area of the interface as the screen recording area; and
  recording dynamic screen contents in the interface with the screen recording control and the at least one display container concealed.

2. The method of claim 1, wherein after the target display container is determined, the method further comprises:
 displaying the screen recording control at a target position in the display area of the target display container.

3. The method of claim 2, wherein displaying the screen recording control at the target position in the display area of the target display container comprises:
 simplifying display parameters of the screen recording control, to obtain a target screen recording control; and
 displaying the target screen recording control at the target position in the display area of the target display container.

4. The method of claim 1, wherein before determining the target display container according to the positional relationship between the screen recording control and the at least one display container, the method further comprises:
 acquiring a position of the screen recording control on the interface.

5. The method of claim 4, wherein acquiring the position of the screen recording control on the interface comprises:
 in response to a click event performed on the screen recording control, acquiring the position of the screen recording control at a time when the click event is triggered.

6. The method of claim 4, wherein acquiring the position of the screen recording control on the interface comprises:
 in response to a dragging event performed on the screen recording control, acquiring the position of the screen recording control at a time when the dragging event ends.

7. The method of claim 1, wherein the recording the dynamic screen contents in the screen recording area comprises:
 displaying a selection control; and in response to detecting a confirmation operation performed on the selection control, recording the dynamic screen contents in the screen recording area; or
 in response to detecting a target touch operation performed on the screen recording control, recording the dynamic screen contents in the screen recording area.

8. The method of claim 6, wherein determining the target display container according to the positional relationship between the screen recording control and the at least one display container comprises:
 in response to the screen recording control being moved, based on the dragging event, to a position where the screen recording control has an overlapping area with a to-be-determined display container of the at least one display container, acquiring a size of the overlapping area; and
 in response to the size of the overlapping area being larger than a preset size, determining the to-be-determined display container as the target display container.

9. The method of claim 8, wherein acquiring the size of the overlapping area comprises:
 acquiring coordinate information of the to-be-determined display container, and acquiring coordinate information of the screen recording control; and
 acquiring the size of the overlapping area, based on the coordinate information of the to-be-determined display container and the coordinate information of the screen recording control.

10. The method of claim 6, wherein determining the target display container according to the positional relationship between the screen recording control and the at least one display container comprises:
 in response to the screen recording control being moved, based on the dragging event, to a position where the screen recording control has an overlapping area with a to-be-determined display container of the at least one display container, acquiring a duration during which the overlapping area exists between the screen recording control and the to-be-determined display container; and
 in response to the duration being longer than a preset duration, determining the to-be-determined display container as the target display container.

11. The method of claim 1, wherein before determining the target display container according to the positional relationship between the screen recording control and the at least one display container, the method further comprises:
 acquiring, as first coordinate information, coordinate information of the at least one display container in a coordinate system, wherein the coordinate system is established in the interface; acquiring, as second coordinate information, coordinate information of the screen recording control in the coordinate system; and obtaining, based on the first coordinate information and the second coordinate information, the positional relationship between the screen recording control and the at least one display container; or
 acquiring, as a first display position, a display position of the at least one display container; acquiring, as a second display position, a display position of the screen recording control; and obtaining, based on the first display position and the second display position, the positional relationship between the screen recording control and the at least one display container.

12. The method of claim 1, wherein the least one display container comprises at least one of a floating window and a split-screen window.

13. An electronic device, comprising
a memory and a processor, wherein the memory is coupled to the processor, the memory stores instructions which, when being executed by the processor, cause the processor to:
determine a target display container according to a positional relationship between a screen recording control and at least one display container that are displayed on an interface of the electronic device, wherein the screen recording control is configured to control recording of dynamic screen contents, wherein the target display container is determined as one of the at least one display container with which the screen recording control fully or partially overlaps;
determine a screen recording area based on a display area of the target display container; and
record dynamic screen contents in the screen recording area;
wherein the instructions, when being executed by the processor, further cause the processor to:
in response to the screen recording control not overlapping with the at least one display container, determine a display area of the interface as the screen recording area, and record dynamic screen contents in the interface with the screen recording control and the at least one display container concealed.

14. The electronic device of claim 13, wherein the instructions, when being executed by the processor, further cause the processor to:
in response to the screen recording control being moved, based on a dragging event, to a position where the screen recording control has an overlapping area with a to-be-determined display container of the at least one display container, acquire a size of the overlapping area; and in response to the size of the overlapping area being larger than a preset size, determine the to-be-determined display container as the target display container; or,
in response to the screen recording control being moved, based on a dragging event, to a position where the screen recording control has an overlapping area with a to-be-determined display container of the at least one display container, acquire a duration during which the overlapping area exists between the screen recording control and the to-be-determined display container; and in response to the duration being longer than a preset duration, determine the to-be-determined display container as the target display container.

15. The electronic device of claim 13, wherein the instructions, when being executed by the processor, further cause the processor to:
in response to the positional relationship between the screen recording control and the at least one display container being a first positional relationship, determine a first display container from the at least one display container as the target display container;
in response to the positional relationship between the screen recording control and the at least one display container being a second positional relationship, determine a second display container from the at least one display container as the target display container,
wherein the first positional relationship is different from the second positional relationship, and the first display container is different from the second display container.

16. The electronic device of claim 13, wherein the instructions, when being executed by the processor, further cause the processor to:
simplify display parameters of the screen recording control, to obtain a target screen recording control; and
display the target screen recording control at a target position in the display area of the target display container.

17. A non-transitory computer-readable storage medium storing program codes, which when executed by a processor, cause the processor to:
in response to a dragging event performed on a screen recording control displayed on an interface of an electronic device, acquire a position of the screen recording control on the interface at a time when the dragging event ends wherein at least one display container is also displayed on the interface, and the screen recording control is configured to control recording of screen contents;
determine a target display container according to a positional relationship between the screen recording control and the at least one display container, comprising:
in response to the screen recording control being moved, based on the dragging event, to a position where the screen recording control has an overlapping area with a to-be-determined display container of the at least one display container, acquiring a size of the overlapping area; and
in response to the size of the overlapping area being larger than a preset size, determining the to-be-determined display container as the target display container; and
determine a screen recording area based on a display area of the target display container.

18. The method of claim 1, wherein displaying the interface comprises:
displaying application contents of an application running in foreground of an electronic device; and
in response to a display-container displaying instruction received during running of the application, displaying the at least one display container on the interface of the electronic device and switching the application contents of the application to be displayed in the at least one display container, and displaying the screen recording control on the interface.

19. The electronic device of claim 14, wherein acquiring the size of the overlapping area comprises:
acquiring coordinate information of the to-be-determined display container, and acquiring coordinate information of the screen recording control; and
acquiring the size of the overlapping area, based on the coordinate information of the to-be-determined display container and the coordinate information of the screen recording control.

20. The electronic device of claim 13, wherein the instructions, when being executed by the processor, further cause the processor to:
display application contents of an application running in foreground of the electronic device;
in response to a display-container displaying instruction received during running of the application, display the at least one display container on the interface and switching the application contents of the application to be displayed in the at least one display container, and display the screen recording control on the interface.

\* \* \* \* \*